United States Patent [19]

Harmer et al.

[11] Patent Number: 6,001,762
[45] Date of Patent: Dec. 14, 1999

[54] REACTIVATION OF PERFLUORINATED ION-EXCHANGE MICROCOMPOSITE CATALYSTS

[75] Inventors: Mark Andrew Harmer; Qun Sun, both of Wilmington, Del.

[73] Assignee: E. I. du Pont de Nemours and Company, Wilmington, Del.

[21] Appl. No.: 09/018,822

[22] Filed: Feb. 4, 1998

Related U.S. Application Data

[60] Provisional application No. 60/040,074, Feb. 17, 1997.
[51] Int. Cl.⁶ .............................. B01J 37/30; B01J 20/34
[52] U.S. Cl. .................. 502/12; 502/27; 502/29; 502/33
[58] Field of Search ...................... 502/12, 27, 29, 502/33, 56; 521/26

[56] References Cited

U.S. PATENT DOCUMENTS

| | | | |
|---|---|---|---|
| 2,992,189 | 7/1961 | Friedman et al. | 252/413 |
| 4,051,079 | 9/1977 | Melby | 260/2.2 R |
| 4,800,186 | 1/1989 | Tasset | 502/33 |
| 5,824,622 | 10/1998 | Harmer et al. | 502/407 |

FOREIGN PATENT DOCUMENTS

| | | | |
|---|---|---|---|
| WO 95/19222 | 7/1995 | WIPO | B01J 31/10 |
| WO 96/19288 | 6/1996 | WIPO | B01J 31/10 |

OTHER PUBLICATIONS

Barbara Kanegsberg, Precision cleaning without ozone depleting chemicals, *Chemistry & Industry*, 787–791, Oct. 21, 1996.

*Primary Examiner*—John F. Niebling
*Assistant Examiner*—Alexander G. Ghyka

[57] ABSTRACT

Catalyst comprising a perfluorinated ion-exchange microcomposite can be reactivated upon contact with at least one cleaning agent, such as an oxidizing agent, organic solvent, supercritical fluid or detergent. The process may further comprise heating prior to, during or after contact followed by washing with water and/or an organic solvent.

7 Claims, No Drawings

6,001,762

REACTIVATION OF PERFLUORINATED ION-EXCHANGE MICROCOMPOSITE CATALYSTS

This application claims the priority benefit of U.S. Provisional Application 60/040,074, filed Feb. 17, 1997.

BACKGROUND OF THE INVENTION

Catalysts comprising perfluorinated microcomposites are useful in a variety of catalytic reactions. As a result of their use in some of these reactions or during storage, contaminants may form upon or within the catalyst causing the catalyst to lose some or all of its activity. In some cases the used catalyst can be recycled by simply treating the used catalyst with an acid, such as nitric acid, followed by washing with water to remove any excess acid. (See WO 95/19222). However, following some catalytic reactions, this method is not sufficient to restore the activity of the catalyst to a useful level. Thus, there is a need to provide a means for reactivating or increasing the activity of a used perfluorinated ion exchange microcomposite catalyst.

SUMMARY OF THE INVENTION

The present invention provides a process for reactivating a catalyst comprising a perfluorinated ion exchange microcomposite which has been deactivated during storage or through use in a catalytic reaction, comprising: contacting the deactivated catalyst with at least one cleaning agent for a time sufficient to increase the activity of the catalyst, provided that when an acid is used as the cleaning agent, the catalyst is contacted with at least one additional cleaning agent.

DETAILED DESCRIPTION

Perfluorinated ion exchange microcomposite catalysts are useful in various catalytic reactions, for example, in reactions such as hydrocarbon isomerization; polymerization, such as the conversion of tetrahydrofuran to polytetrahydroftiran; carbonylation; carboxylation; hydrolysis; condensation; esterification, such as the esterification of acetic acid with cyclohexene; etherification; hydration; aromatic acylation, alkylation and nitration, such as alkylation of toluene with n-heptene or diphenyl ether with dodecene, acylation of m-xylene with benzoyl chloride, or nitration of benzene with nitric acid; metathesis; aliphatic alkylation; dimerization, such as dimerization of alpha methyl styrene; decomposition of organic hydroperoxides; sulfonation or nitration of organic compounds; and oxyalkylation of hydroxylic compounds. The use of such catalysts in these processes does however suffer from the problem that the catalyst may be deactivated with time so that the activity of the catalyst, reflected in the reactant conversion and selectivity, decreases gradually with time. Perfluorinated ion exchange microcomposite catalysts may even become contaminated during storage. Treatment of such deactivated catalysts with an acid, such as nitric acid, followed by removal of the excess acid with water has been used as a means for restoring the catalyst. However, such treatment is not wholly adequate, and the catalyst may, despite such treatment, still operate with decreased activity and selectivity. Since the cost of catalyst replacement can be high, it is desirable that satisfactory catalyst activity and selectivity are maintained for as long as possible.

The activity and selectivity of deactivated perfluorinated ion exchange microcomposite catalysts can be substantially restored and the effective active lifetime of the catalyst can be increased if the catalyst is contacted with at least one cleaning agent. By "perfluorinated ion exchange microcomposite" is meant a perfluoriniated ion-exchange polymer with pendant sulfonic acid groups and/or carboxylic acid groups entrapped within and highly dispersed throughout a network of metal oxide wherein the weight percentage of perfluorinated ion-exchange polymer (PFIEP) in the microcomposite is from about 0.1 to about 90 percent. The size of the pores in the microcomposite is about 1 nm to about 75 nm, and the microcomposite optionally further comprises pores having a size in the range of about 75 nm to about 1000 nm. Such microcomposites are described in U.S. application Ser. No. 08/574,571, filed Nov. 20, 1995, now U.S. Pat. No. 5,795,084, incorporated by reference herein and in a corresponding PCT publication W095/19222. The microcomposite can be in any size or shape, such as ground into particles or shaped into spheres. The PFIEP preferably contains pendant sulfonic acid groups, and is most preferably, a sulfonated NAFION® PFIFP. NAFION® is a registered trademark of E. I. du Pont de Nemours and Company. The weight percentage of PFIEP preferably ranges from about 5% to about 80%, most preferably 10% to about 15%. The metal oxide network is preferably silica, alumina, titania, germania, zirconia, alumino-silicate, zirconyl-silicate, chromic oxide, iron oxide, or mixtures thereof, most preferably silica.

In the present process such perfluorinated ion exchange microcomposite catalysts are reactivated. By "reactivated" is meant that the catalytic activity and/or selectivity with which the initial catalyst could be operated has been restored, at least to a greater extent than was possible by known treatments for this type of microcomposite catalyst. The deactivated catalyst which is reactivated by the process of the present invention may have previously been subjected to one or more treatments with acid and water to remove contaminants deposited on or within the catalyst, prior to the reactivation process of the present invention.

The catalyst may be referred to as deactivated when it has been employed as a catalyst for such a time that the absolute conversion of the reaction in which it is being employed at the particular operating conditions employed has dropped by at least about 5% conversion, especially by at least about 10% conversion, although the catalyst may be referred to as deactivated after much shorter or longer periods of operation.

The catalyst can be removed from the reactor and/or reaction medium prior to reactivation, or the reactivation process can be carried out in the reactor, i.e. in situ, in which case the reactant feeds are temporarily stopped while the reactivation process is carried out. The reactivation process is preferably carried out in the substantial absence of the substrate of the reaction in which the catalyst is being employed. If the reactivation process is carried out in the absence of the substrate, a separate "re-activation vessel" can be used to which the deactivated catalyst is transferred from the reactor vessel.

In the present process, the deactivated catalyst is contacted with at least one cleaning agent, provided that when the cleaning agent is an acid the deactivated catalyst is contacted with at least one additional cleaning agent. By "cleaning agent" is meant a compound capable of removing at least a portion of the contaminants on or within the deactivated catalyst to yield a reactivated catalyst. By "on or within" is meant on the surface of the catalyst, within the pores of the catalyst, or both. Representative examples of cleaning agents are oxidizing agents, organic solvents, supercritical fluids and detergents. Suitable oxidizing agents comprise oxygen or air; acidic or neutral peroxide, such as hydrogen peroxide; oxidizing acids, such as peracetic acid, nitric acid, sulfuric acid, trifluoroacetic acid, chromic acid, and mixtures of such acids; halogens, such as chlorine, bromine, or iodine; or chlorine monoxide. Suitable organic solvents comprise hydrocarbons, such as aliphatic hydrocarbons, cyclic hydrocarbons such as cyclohexane, benzene and single-ring aromatics bearing one or more alkyl substituents which are the same or different (such as toluene; benzene; o-, m-, p-diethyl benzene; ethyl benzene; o-, m-, p-diisopropyl benzene; tert-butyl benzene, xylenes, or terpenes such as limonene or alpha pinene; oxygenates, such as alcohols (e.g., methyl alcohol, ethanol, isopropyl alcohol), ketones (such as acetone and methyl ethyl ketone), ethers (such as tetrahydrofuran) or esters (such as ethyl acetate); chlorinated hydrocarbons, such as chloroform, methyl chloroform, 1,1,1-trichloroethane, methylene chloride, trichloroethylene, perchloroethylene, or trans-1,2-dichloroethylene; chlorofluorocarbons, such as CFC-113; hydrofluorocarbons, such as HFC 43-10; hydrofluoroethers, such as HFE-7100; hydrochlorofluorocarbon, such as HCFC-141, HCFC-123, HCFC-225; brominated solvents, such as alkyl bromide or bromochloromethane; chlorobenizotrifluoride; acetonitrile; N,N-dimethylformamide; or dimethyl sulfoxide. Suitable supercritical fluids comprise $CO_2$ or $CO_2$ blended with a co-solvent, hydrocarbons and fluorocarbons. Detergents can include degreasing materials or surfactants.

The particular cleaning agent(s) to use is dependent upon the catalytic reaction which deactivated the catalyst, the type of contaminants on or within the catalyst and the percent loading of contaminants. Concentration amounts for the cleaning agents are dependent upon the type and amount of contamination.

The time required to achieve effective reactivation of the deactivated catalyst depends upon the contact time with the cleaning agent(s), concentration of the cleaning agent(s), reactivation temperature, the type of catalytic reaction in which the catalyst became deactivated, and the particle size and shape of the catalyst, as well as its pore size. Agitation may be utilized during the present process. For some combinations of catalyst, contaminant and cleaning agent(s), ultrasonication may be a desirable mode of agitation.

The temperature used during contact of the catalyst with the cleaning agent can vary widely. Ordinarily, effective treatment will not be obtained at temperatures below about 25° C. and the upper temperature limit is defined only by the point at which the PFIEP decomposes. The pressure employed during the reactivation period can also vary widely, for instance from atmospheric pressure to any considered economically feasible. Preferably, the reactivation treatment is conducted at temperatures from about 25° C. to about 280° C., and it is most convenient to employ atmospheric pressure. For flammable cleaning agents, an inert atmosphere such as nitrogen may be desirable.

The use of a second or additional cleaning agent may be desirable to remove additional contaminants or any product of a reaction between the contaminants and the first cleaning agent used. The sequence in which any of the cleaning agents described above is used can vary. The use of a second or additional cleaning agents can be at the same time as the first cleaning agent or can follow contact with the first cleaning agent. It may be desirable in some instances to wash the catalyst with water, preferably deionized water, a second cleaning agent, such as an organic solvent, or with both water and the organic solvent to remove any excess first cleaning agent and/or residual contaminants. This may be under reflux conditions. The catalyst can then be re-washed with the first cleaning agent and the process of washing with water and/or the organic solvent cleaning agent repeated, if necessary. Ending the process with a final wash of deionized water or an acid is preferable. Another possible sequence of steps could involve contacting the deactivated catalyst first with either acetone or methyl ethyl ketone as a first cleaning agent, washing with water, followed by contact with nitric acid as a second cleaning agent.

The reactivation process can further comprise at least one of the following steps: heating the catalyst prior to its contact with the cleaning agent(s), during its contact with the cleaning agent(s) and/or after the cleaning agent(s) is removed, preferably at a temperature ranging from about 25° C. to about 280° C.; isolating the reactivated or partially reactivated catalyst via filtering, decanting or the like; and drying the catalyst preferably at a temperature ranging from about 100° C. to about 200° C., preferably under vacuum, for a time sufficient to yield a dried reactivated catalyst, preferably about 1 hr to about 60 hr. Each step of the reactivation process can be optionally repeated at least once.

Olefin isomerization, such as 1-butene to 2-butene; 1-heptene to 2- and 3-heptene; and 1-dodecene to its isomers, is an important reaction which utilizes the microcomposite catalyst described herein. When utilized in an isomerization reaction for a period of time, the microcomposite catalyst becomes deactivated; however, the present process can be used to reactivate the catalyst. The use of an oxidizing agent and an organic solvent as the cleaning agents has been found to be particularly effective. Preferably, nitric acid and acetone are used as the cleaning agents to reactivate a microcomposite catalyst deactivated through use in an isomerization reaction.

EXAMPLES

The 13 wt % NAFION® resin in silica microcomposite catalyst referred to in the examples below was prepared as described in the following paragraph using a NAFION® PFIEP NR 005 solution. NAFION® PFIEP NR 005 is available from DuPont NAFION® Products, Fayetteville, N.C., is also known as NAFION® SE-5110, and is prepared from resin which is approximately 6.3 tetrafluoroethylene molecules for every perfluoro(3,6-dioxa-4-methyl-7-octenesulfonyl fluoride) molecule ($CF_2$=CF—O—($CF_2$CF ($CF_3$)—O—$CF_2CF_2$-$SO_2$F). After hydrolysis of the resin, the resulting PFIEP has an equivalent weight of approximately 1070. NAFION® PFIEP solutions can be purchased from Aldrich Chemical Co., Milwaukee, Wis., or PFIEP solutions generally can be prepared using the procedure of U.S. Pat. Nos. 5,094,995 and 4,433,082.

204 g of tetramethoxysilane (TMOS), 33 g of distilled water and 3 g of 0.04 M HCl was stirred for 45 min to give a clear solution. To 300 mL of a NAFION® PFIEP solution was added 150 mL of a 0.4 M NaOH solution, while the PFIEP solution was being stirred. After addition of the NaOH solution, the resulting solution was stirred for a further 15 min. The TMOS solution was added rapidly to the stirred PFIEP solution. After about 10–15 sec, the solution gelled to a solid mass. The gel was placed in an oven and dried at a temperature of about 95° C. over a period of about 2 days followed by drying under vacuum overnight. The hard, glass-like product was ground and passed through a 10-mesh screen. The material was then stirred with 3.5 M HCl for 1 hr (with 500 mL of acid), followed by washing with 500 ml deionized water. The solid was collected by filtration. Acidification, washing and filtration were repeated a total of 5 times and after the final wash the solid was dried under vacuum at 100° C. for 24 hours.

EXAMPLE 1

56 g of the 13 wt % NAFION® resin in silica catalyst prepared as described above which had been reacted with a C16 olefin (1-hexadecene) to isomerize the olefin was used. The catalyst contained about 30 wt % of organic contamination from the olefin isomerization reaction and was dark brown or black in color. The catalyst material was mixed with 160 g of a 35 wt % nitric acid solution. The catalyst material and solution were stirred and heated to 90° C. and heated for 3 hr. A red brown gas was evolved. The temperature was increased to 100° C. and the mixture and contents were left overnight. A thick yellow oil formed on top of the nitric layer. The flask and contents were cooled to room temperature and the oil was decanted off with the nitric acid. The catalyst material was washed with water (1 liter) on a filter funnel followed by washing with acetone. The solid was then placed in 250 ml of acetone and the mixture was heated to reflux. The acetone became a deeper yellow color and the material was heated for 3 hr and then cooled to room temperature. The solid was filtered and washed with water and then nitric acid (160 g of a 35 wt % nitric solution) was added to the solid and the material was re-heated to 100° C. and kept at that temperature for 8 hr. The material was then washed with water and placed in acetone and heated to reflux for 3 hr. The solid was collected via filtration and washed with water followed by 1 liter of 3.5 M HCl. Finally the catalyst was dried at 100° C. for 24 hr to yield the reactivated catalyst. The TGA of the material showed the organic contaminate had been removed, and the TGA was about the same as the original unused catalyst which showed a characteristic drop (decrease in mass) due to the decomposition of the NAFION® resin. The weight loss was in the range of 12–14 wt % over 200–500° C.

EXAMPLE 2

1-Dodecene isomerization to its linear isomers was carried out in the liquid phase at 75° C. over a fresh 13 wt % NAFION®/silica microcomposite, a used 13 wt % NAFION®/silica microcomposite, a treated 13 wt % NAFION®/silica microcomposite, and a reactivated 13 wt % NAFION®/silica microcomposite. All catalysts were initially prepared as described above and included four fresh catalysts from different batches, used catalyst, treated catalyst washed with nitric acid only, and two reactivated catalysts subjected to the process of Example 1. 10 g of 1-dodecene, 30 g of decane and 2 g of solid catalyst which was predried were charged in a two-neck flask with a magnetic stir bar for mixing. Decane served as the solvent and the internal standard for the gas chromatography (GC) analysis. Liquid samples were taken at certain time intervals and analyzed by the GC. Only the 1-dodecene conversion was monitored by following the decreasing of its GC peak area. Very good material balances (>98%) were obtained and formation of oligomers was negligible. The 1-dodecene conversion after 1 hr at 75° C. and the first order rate constants that were calculated from the data at low 1-dodecene conversion (<15%) are listed in Table 1.

TABLE 1

| Catalyst | 1-Dodecene Conversion (%) | Rate Constant (mol × $10^{-3}$/g catalyst.min) |
|---|---|---|
| Fresh (Batch #1) | 72.4 | 39 |
| Fresh (Batch #2) | 68.9 | 34 |
| Fresh (Batch #3) | 73.9 | 51 |
| Fresh (Batch #4) | 73.5 | 59 |
| Used Catalyst |  | 53.4 |
| Treated/Nitric Acid Wash Only | 6.4 | 1 |
| Reactivated #1 | 69.2 | 31 |
| Reactivated #2 | 76.7 | 39 |

What is claimed is:

1. A process for reactivating a catalyst comprising a perfluorinated ion exchange microcomposite which has been deactivated during storage or through use in a catalytic reaction, said perfluorinated ion exchange microcomposite comprising a perfluorinated ion-exchange polymer with pendant sulfonic acid groups and/or carboxylic acid groups entrapped within and highly dispersed throughout a network of metal oxide wherein the weight percentage of perfluorinated ion-exchange polymer in the microcomposite is about 0.1 to about 90 percent, comprising: contacting the deactivated catalyst with at least one cleaning agent selected from the group consisting of an oxidizing agent, an organic solvent, a supercritical fluid, and a detergent for a time sufficient to increase the activity of the catalyst, provided that when an acid is used as the cleaning agent, the catalyst is contacted with at least one additional cleaning agent selected from the group consisting of an oxidizing agent, an organic solvent, a supercritical fluid, and a detergent.

2. The process of claim 1 wherein the oxidizing agent is selected from the group consisting of: oxygen, air, neutral peroxide, acidic peroxide, an oxidizing acid, a halogen, and chlorine monoxide.

3. The process of claim 1 wherein the oxidizing acid is selected from the group consisting of: nitric acid, peracetic acid, sulfuric acid, trifluoroacetic acid, and chromic acid, and mixtures of such acids.

4. The process of claim 1 wherein the organic solvent is selected from the group consisting of: a hydrocarbon, an oxygenate, a chlorinated hydrocarbon, a chlorofluorocarbon, a hydrofluorocarbon, a hydrofluoroether, a hydrochlorofluorocarbon, a brominated solvent, chlorobenzotrifluoride, acetonitrile, N,N-dimethylformamide, and dimethyl sulfoxide.

5. The process of claim 1 further comprising heating the catalyst at a temperature ranging from about 25° C. to about 280° C.

6. The process of claim 1 wherein the catalytic reaction is an isomerization reaction.

7. The process of claim 6 wherein the at least one cleaning agent is nitric acid and acetone.

* * * * *